(12) United States Patent
Sobue

(10) Patent No.: US 8,701,394 B2
(45) Date of Patent: Apr. 22, 2014

(54) ELECTRICALLY HEATED CATALYTIC DEVICE AND VEHICLE EQUIPPED WITH ELECTRICALLY HEATED CATALYTIC DEVICE

(75) Inventor: Kazuaki Sobue, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 456 days.

(21) Appl. No.: 13/181,625

(22) Filed: Jul. 13, 2011

(65) Prior Publication Data

US 2012/0011834 A1    Jan. 19, 2012

(30) Foreign Application Priority Data

Jul. 15, 2010    (JP) .................. 2010-161043

(51) Int. Cl.
*F01N 3/10*    (2006.01)
(52) U.S. Cl.
USPC .................... 60/300; 60/286; 60/295
(58) Field of Classification Search
USPC .................... 60/286, 295, 297, 300
See application file for complete search history.

(56) References Cited

U.S. PATENT DOCUMENTS 3,889,464 A * 6/1975 Gardner ................. 60/286
5,465,573 A * 11/1995 Abe et al. ............... 60/274
5,597,503 A * 1/1997 Anderson et al. ........ 219/552

FOREIGN PATENT DOCUMENTS

| JP | 4-136411 | 5/1992 |
|----|----------|--------|
| JP | 5-10117 | 1/1993 |
| JP | 5-115795 | 5/1993 |
| JP | 6-264718 | 9/1994 |
| JP | 11-257063 | 9/1999 |
| JP | 2003-56328 | 2/2003 |
| JP | 2010-115634 | 5/2010 |

OTHER PUBLICATIONS

Notification of Reason(s) for Refusal for JP Appl. No. 2010-161043 dated Jul. 5, 2012.

* cited by examiner

*Primary Examiner* — Thomas Denion
*Assistant Examiner* — Matthew T Largi
(74) *Attorney, Agent, or Firm* — Finnegan, Henderson, Farabow, Garrett & Dunner, LLP

(57) ABSTRACT

An electrically heated catalytic device includes an electrically heated catalyst accommodated in an outer casing provided on an exhaust pipe. A heater ring made of an insulating material is provided adjacent to an outer peripheral edge portion of an upstream end face of the electrically heated catalyst. The heat of the electrically heated catalyst is transferred to the heater ring by generating resistive heat in the electrically heated catalyst. When the soot in exhaust gas accumulates on the surface of the heater ring, the deposits of soot is removed through combustion by the heat from the surface of the heater ring.

7 Claims, 5 Drawing Sheets

ELECTRICALLY HEATED CATALYTIC DEVICE AND VEHICLE EQUIPPED WITH ELECTRICALLY HEATED CATALYTIC DEVICE

INCORPORATION BY REFERENCE

The disclosure of Japanese Patent Application No. 2010-161043 filed on Jul. 15, 2010 including the specification, drawings and abstract is incorporated herein by reference in its entirety.

BACKGROUND OF THE INVENTION

1. Field of the Invention

The invention relates to an electrically heated catalytic device and a vehicle, and may be applied to, for example, an exhaust gas control device provided in the exhaust system of a hybrid vehicle that includes an engine and an electric motor or another kind of vehicle, and a vehicle equipped with the exhaust gas control device.

2. Description of Related Art

A metal catalyst (platinum, palladium, or the like) used in the purification of exhaust gas, which is fitted in an exhaust system (i.e., an exhaust pipe) of an automobile exerts high catalytic activity under high-temperature conditions. Accordingly, when the exhaust system is still cold, such as when an engine is first started, the catalyst, which is fitted in the exhaust system, has lower activity than when the engine has been running continuously for a period of time. Thus, there have been demands for an art of instantaneously purifying exhaust gas even under such a circumstance. In particular, a hybrid vehicle, which has become increasingly popular recently, can not only run by being driven by an engine but also run only by an electric motor (i.e., by a power from a battery) (perform EV running). In conjunction with this EV running, the engine is frequently stopped. In a plug-in hybrid vehicle, EV running plays a more principal role. In a hybrid vehicle, the cold state of the exhaust system as during the aforementioned start of the engine may continue even after the vehicle has been moving for a while. There have been demands for an art of quickly purifying exhaust gas even under such a circumstance.

In order to meet the aforementioned demand, Japanese Patent Application Publication No. 5-115795 (JP-A-5-115795) describes an exhaust gas control device that includes an exhaust gas purification catalyst (a metal catalyst) for the purpose of improving the capacity to purify exhaust gas in a cold state as during the start of an engine. The described exhaust gas control device includes an energization-exothermic honeycomb carrier and a pair of electrodes connected to the honeycomb carrier. The exhaust gas control device supplies power to the electrodes to energize the honeycomb carrier, thereby causes the honeycomb carrier to generate heat, which in turn heats the exhaust gas purification catalyst.

However, the conventional energization-exothermic exhaust gas control device described in JP-A-5-115795 takes no countermeasure against the influence of soot present in exhaust gas. That is, the soot present in exhaust gas is a conductive material that mainly contains carbon. Therefore, when the soot discharged from the engine accumulates on the energization-exothermic honeycomb carrier, the deposits of soot may cause short-circuiting in an unexpected region of the honeycomb carrier. Such unforeseen short-circuiting leads to a failure in the generation of heat from the honeycomb carrier or causes inconveniences such as electrical leakage and the like through the formation of an unexpected conductive path in the exhaust gas control device, and is therefore unfavorable.

SUMMARY OF THE INVENTION

The invention provides a catalytic device (an electrically heated catalytic device) equipped with an electrical heating mechanism that can suitably heat an exhaust gas purification catalyst even when an exhaust system is in a cold state as during, for example, the start of an engine, while avoiding the influence of soot discharged from the engine, and a vehicle equipped with the catalytic device.

In a first aspect of the invention, an electrically heated catalytic device provided in an exhaust pipe (typically in an exhaust pipe of a vehicle) is equipped with an outer casing (which may constitute part of the exhaust pipe), and an electrically heated catalyst composed of an energization-exothermic substrate (a catalytic carrier) that is formed of a material generating heat through energization, allows exhaust gas to flow therethrough, and is so retained in the outer casing as to allow energization from an outside in a state of being insulated from an inner wall of the outer casing, and a metal catalyst carried by the energization-exothermic substrate. In the electrically heated catalytic device disclosed herein, a heater ring made of an insulating material is fitted to the electrically heated catalyst on an upstream side with respect to the exhaust pipe in a state of being in contact with an outer peripheral edge portion of an upstream end face of the substrate. Furthermore, the electrically heated catalytic device disclosed herein is equipped with a soot combustion removal portion that removes through combustion soot in exhaust gas, which is deposited on the heater ring, by heat of the heater ring. When the substrate generates heat through energization, the heater ring is heated through the transfer of the heat to the heater ring.

According to this construction, out of the soot that has entered the outer casing together with exhaust gas, the soot deposited on the surface of the heater ring that is in contact with the upstream end face of the electrically heated catalyst can be removed through combustion by the heat that is transferred to the heater ring when the substrate generates heat through energization. In this manner, the heater ring, as it were, serves as a barrier, thus making it possible to prevent a deposition of the soot (a conductive deposition) from reaching an upstream end face of the energization-exothermic substrate beyond the heater ring from the inner wall of the outer casing, and to reliably prevent the short-circuiting between the inner wall of the outer casing and the electrically heated catalyst (i.e., the energization-exothermic substrate). In this aspect of the invention, the heater ring made of the insulating material and provided adjacent to the electrically heated catalyst (the energization-exothermic substrate) plays a role of removing the soot adherent to the surface of the heater ring through combustion and hence cutting off a conduction path of the deposition of the soot. This heater ring uses the electrically heated catalyst (the energization-exothermic substrate) itself as a heat source, and hence eliminates the necessity to provide a dedicated heat source separately. As a result, the construction of the heater ring can be made compact.

Further, the heater ring can remove other adherent substances (including dew drops) as well as the soot in exhaust gas through heating. Accordingly, a contribution can be made toward maintaining the performance of the device itself and enhancing the durability thereof.

Further, an insulating mat (including a sheet-like mat, the same will hold true hereinafter) may be arranged between the inner wall of the outer casing and the electrically heated catalyst (the energization-exothermic substrate). By installing the mat at this position, the insulating properties of the electrically heated catalyst (the energization-exothermic substrate) from the inner wall of the outer casing are realized. The insulating mat may be made of a material that can also function as a heat insulating material (e.g., a ceramic material such as alumina or the like).

Further, a region of the outer peripheral edge portion of the upstream end face of the electrically heated catalyst which is in contact with the heater ring may have formed thereon a dense portion formed of a material that generates heat through energization (typically a material identical in nature to the energization-exothermic substrate). By forming this energization-exothermic dense portion on a face adjacent to the heater ring, a large contact area can be ensured between an exothermic body and the heater ring during energization. As a result, the heating efficiency of the heater ring can be enhanced, and soot can be more effectively removed through combustion.

Further, the upstream end face of the electrically heated catalyst may form the dense portion over a range that is equal in area to a face adjacent to the heater ring.

In the case where the heater ring is located adjacent to the upstream end face of the electrically heated catalyst (i.e., the energization-exothermic substrate constituting the catalyst portion), a sufficient contact area of the face adjacent to the heater ring cannot be ensured in some cases, due to the presence of a large number of cells (gaps) along the exhaust gas passage in the energization-exothermic substrate constituting the electrically heated catalyst. According to the construction of the foregoing aspect of the invention, the electrically heated catalyst (the energization-exothermic substrate) can be ensured of a sufficient contact face that is in contact with the heater ring (a sufficient face adjacent to the heater ring). Thus, heat can be efficiently transferred from the electrically heated catalyst (the energization-exothermic substrate) to the heater ring, and the time required for raising the temperature of the heater ring can further be reduced. As a result, the soot adherent to the surface of the heater ring can be more swiftly removed through combustion.

Further, an upstream catalyst may be arranged in the outer casing upstream of the electrically heated catalyst via a gap, and the heater ring may be arranged in the gap between the electrically heated catalyst and the upstream catalyst.

According to this construction, exhaust gas can be more efficiently purified due to the operation of the upstream catalyst, and the gap between the electrically heated catalyst and the upstream catalyst operates as a space for blocking the movement of heat in the outer casing. Thus, the discharge of heat from the upstream end face of the electrically heated catalyst can be suppressed, and the heater ring can be more swiftly heated through the enhancement of the temperature rising properties of the electrically heated catalyst (the energization-exothermic substrate). Further, the heat storage properties of the electrically heated catalyst (the energization-exothermic substrate) and the heater ring are improved due to the presence of the gap. Therefore, the amount of power consumption can also be held small by reducing the frequency with which the electrically heated catalyst is energized.

Further, in another preferred example of the electrically heated catalytic device disclosed herein, a downstream catalyst is arranged also downstream of the electrically heated catalyst via a gap. In this case, heat can be restrained from being discharged from the downstream end face of the electrically heated catalyst as well as the upstream end face of the electrically heated catalyst, and the heat storage properties of the electrically heated catalyst and the heater ring can further be improved.

In a second aspect of the invention, a vehicle includes an engine and the electrically heated catalytic device according to the first aspect of the invention. The electrically heated catalytic device disclosed herein can be suitably used to treat exhaust gas of the engine. In the case where a power supply capable of sufficiently heating the heater ring and the electrically heated catalyst (the energization-exothermic substrate) provided in the outer casing can be provided, the electrically heated catalytic device is preferably applied as an exhaust gas control device for a vehicle such as a gasoline engine vehicle, a diesel engine vehicle, a hybrid vehicle, or the like. The type of the vehicle is not limited either. The electrically heated catalytic device is widely applicable to an exhaust system of a large vehicle such as a truck, a bus or the like as well as a small vehicle such as an automobile, a motorcycle or the like. Further, the electrically heated catalytic device can also be utilized to treat exhaust gas of a machine tool, a ship, or the like that is equipped with an engine.

BRIEF DESCRIPTION OF THE DRAWINGS

Features, advantages, and technical and industrial significance of example embodiments of the invention will be described below with reference to the accompanying drawings, in which like numerals denote like elements, and wherein:

FIG. 2A is a front view and FIG. 2B is a lateral view;

FIG. 3A is a front view and FIG. 3B is a cross-sectional view;

DETAILED DESCRIPTION OF EMBODIMENTS

Figure 1:
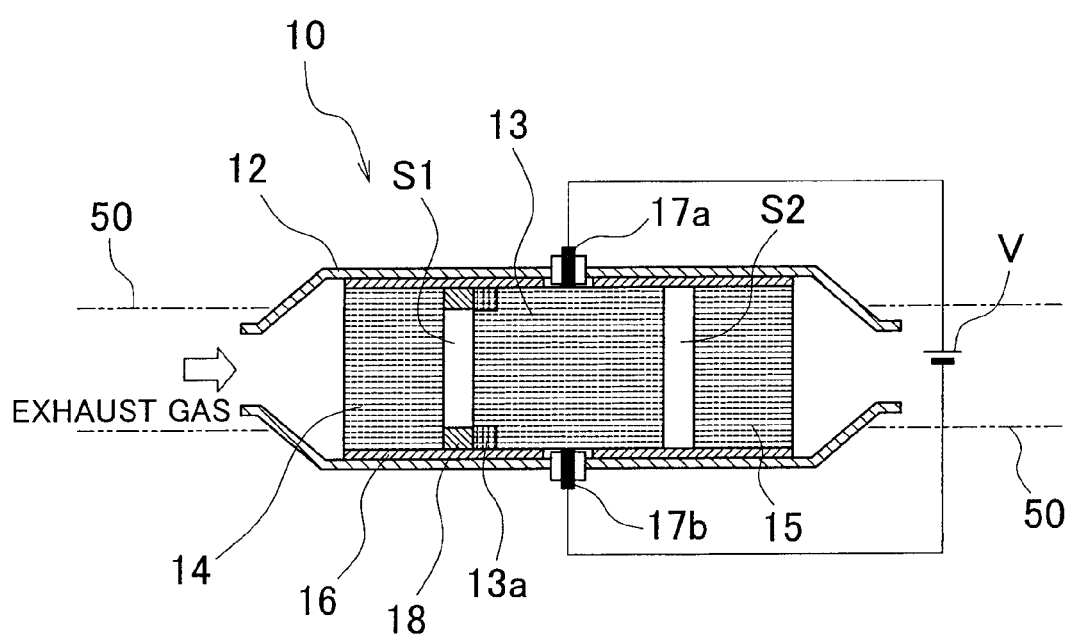
FIG. 1 is a cross-sectional view schematically showing an electrically heated catalytic device according to a first embodiment of the invention.

Example embodiments of the invention will be described below. It should be noted that matters other than items specifically mentioned in the present specification and necessary for the implementation of the invention can be grasped as items designable by those skilled in the art on the basis of the related art in the present technical field. The invention may be implemented based on the present specification and the technical common sense in the present technical field.

Preferably, the outer casing of the electrically heated catalytic device is made of a material that has excellent heat resistance, durability, workability and the like. Typically, the outer casing is formed of a metal material (a conductive material) such as, for example, stainless steel. Alternatively, the outer casing may be made of a non-metal material (ceramic or the like). If an exhaust pipe of the vehicle is made of a metal (a conductive material), the exhaust pipe itself may be used as the outer casing. Further, the outer casing may assume a so-called tubular shape with an inner space formed therein. A circular cylindrical outer casing, a rectangular cylindrical outer casing or the like can be adopted as the outer casing in accordance with the shape of an energization-exothermic substrate arranged in the inner space.

A non-metal or metal material that can be resistively heated may be adopted as the energization-exothermic substrate and is accommodated in the outer casing to form a skeletal region of the electrically heated catalyst. A porous body (e.g., a monolith body of a honeycomb structure), with a regular cell structure, that is made of conductive silicon carbide (SiC) doped with impurities (N and the like), conductive molybdenum disilicide ($MoSi_2$) doped with impurities (N and the like), or the like, may serve as the non-metal exothermic body. Further, a metal porous body (e.g., of a regular cell structure, typically a honeycomb structural body) made of a Ni—Cr type metal, a Fe—Cr—Al type metal or the like can be used as a metal exothermic body. Instead of the regular honeycomb- structure, the cell structure constituting the exhaust gas flow channel may be a foamed porous body (a sponge-like porous body in which irregular pores are formed) of an indeterminate form with cells formed therein irregularly.

Any suitable metal catalyst may be carried on a substrate surface of the energization-exothermic substrate. A metal catalyst made of various types of metals or metal compounds may be used in accordance with the purpose or the operation of the catalyst. For example, a metal catalysts made of platinoid elements such as palladium (Pd), rhodium (Rh), platinum (Pt), compounds of platinoid elements, or other noble metals and compounds thereof may be used. In combination with this catalyst, another metal catalyst made not of a noble metal but of an alkali metal, an alkaline-earth metal, a transition metal or the like may be used.

It should be noted that a method of having various metal catalysts carried on the energization-exothermic substrate may be the same as in a conventional case where this kind of catalyst portion is formed, and does not characterize the invention in particular. For example, various metal catalysts may be carried on the substrate (the carrier) through conventional methods such as an impregnation, ion exchange, sol-gel, wash coat or the like. For example, a porous ceramic layer (e.g., a carrier layer made of porous alumina) may be formed on the substrate by soaking the substrate in a slurry composition of ceramic powders (e.g., alumina powders) and then drying the substrate and the composition using the wash coat method. A metal catalyst may be carried on the substrate by adding a slurry composition, which contains powders of a metal or a metal compound constituting a predetermined metal catalyst as a main constituent, to the carrier layer and calcining the composition, preferably after the composition is dried.

Further, the insulating material that forms the heater ring may be selected in consideration of heat resistance, durability, heat conductivity and the like. A non-conductive ceramic member made of, for example, silicon carbide (SiC) is preferably used as the insulating material that forms the heater ring. It should be noted that the ring-like shape of the heater ring may be set in accordance with the substrate shape of the energization-exothermic substrate, and that the heater ring may assume an elliptical shape, an oval shape, a rectangular shape or the like as well as a circular shape.

An example embodiment of an electrically heated catalytic device constructed of the outer casing, the energization-exothermic substrate, and the metal catalyst, as described above, will be described hereinafter with reference to the drawings. In the description below, members and regions that are substantially identical in operation are denoted in the drawings by the same reference symbols, and that the same description may be omitted or simplified.

The overall structure of an electrically heated catalytic device 10 according to this embodiment is shown in FIG. 1. That is, the electrically heated catalytic device 10 may be applied to the exhaust system of an engine of, for example, a hybrid vehicle (typically an automobile), and includes an energization-exothermic substrate (preferably a monolith body of a regular cell (honeycomb) structure) 13 as described above, which is accommodated in a metal outer casing 12 provided in a midway portion of an exhaust pipe 50. An upstream catalyst 14 is provided upstream of the energization-exothermic substrate 13, and a gap S1 is maintained between the upstream catalyst 14 and the energization-exothermic substrate 13. A downstream catalyst 15 is provided downstream of the energization-exothermic substrate 13, and a gap S2 is maintained between the downstream catalyst 15 and the energization-exothermic substrate 13. A heater ring 18 is provided in the gap S1 between the energization-exothermic substrate 13 and the upstream catalyst 14. The heater ring 18 is sandwiched between and located adjacent to the energization-exothermic substrate 13 and the upstream catalyst 14.

An insulating mat (an insulating sheet) 16 is provided between the outer casing 12 on the one hand and respective catalysts 13, 14, and 15 and the heater ring 18 on the other hand. The insulating mat 16 is preferably formed in a sheet-like shape from a ceramic fiber with excellent heat resistance, insulating properties, strength and the like. For example, a mat made of non-expansive alumina and mats made of other various expansive ceramics may be suitably employed. The mat 16 according to this embodiment of the invention is made of alumina, which has insulating properties and heat insulating properties, and seals gaps between the inner wall of the outer casing on the one hand and the respective catalysts 13, 14, and 15 and the heater ring 18 on the other hand, thereby making it possible to stably retain the respective catalysts 13, 14, and 15 and the heater ring 18 at fixed positions in the outer casing 12 respectively.

Next, the electrically heated catalyst 13 according to this embodiment of the invention will be described. Employed as the electrically heated catalyst 13 is a catalyst having various catalytic metals, for example, palladium (Pd) and rhodium (Rh) carried on a conductively exothermic porous substrate (e.g., a monolith-type honeycomb structural body), which is made of conductive silicon carbide (SiC) formed by, for example, doping the silicon carbide with impurities (N and the like) according to a common procedure and has, for example, 300 to 800 cells per square centimeter (e.g., 600 cells per square centimeter) and a cell thickness of about 0.05 to 0.3 mm (e.g., 0.08 mm), via a carrier layer (e.g., a porous ceramic layer made of porous alumina) formed on a surface of the substrate typically according to a method as described above. Further, various catalysts may be employed as the upstream catalyst 14 and the downstream catalyst 15, which are shown in the drawing, as long as the energization-exothermic substrate is not contiguous with each of the upstream catalyst 14 and the downstream catalyst 15. Preferably, a monolith-type honeycomb structural body having a predetermined metal catalyst carried on an insulating ceramic substrate made of cordierite, silicon carbide (SiC) or the like, which is excellent in heat resistance and durability, can be employed. In this case, a structure having palladium (Pd), rhodium (Rh), platinum (Pt) and the like carried on a non-conductive substrate (which has, for example, 300 to 800 cells per square centimeter (e.g., 600 cells per square meter)

and a cell thickness of 0.05 to 0.3 mm (e.g., 0.08 mm)) via the aforementioned alumina-type carrier layer may be employed. In one example of combination in this kind of catalytic device, Pd and Rh are carried on the upstream catalyst 14 and the electrically heated catalyst 13, and Pt and Rh are carried on the downstream catalyst 15. It should be noted that the configuration of the catalysts 13, 14, and 15 may be changed as appropriate in accordance with the intended use of the electrically heated catalytic device 10 according to this embodiment of the invention. Typically, a three-way catalyst, an occlusion/reduction-type NOx catalyst, a selective reduction-type NOx catalyst, an oxidation catalyst or the like may be selected as the catalytic device provided in the exhaust pipe 50 of the vehicle as appropriate for its application. The electrically heated catalytic device 10 described herein is not limited by the type or form of the catalyst carried thereon.

As shown in the drawing, a positive electrode 17a and a negative electrode 17b, which serve to energize the electrically heated catalyst 13, are provided at predetermined positions of the outer casing 12 respectively. The electrodes 17a and 17b penetrate a insulating mat 16 in a state of being insulated from the outer casing 12, and contact the outer peripheral face of the electrically heated catalyst 13. A high-output battery V (e.g., equal to or higher than 100 V and equal to or lower than 1000 V, typically 300 to 600 V) mounted on a vehicle such as a hybrid vehicle or the like is wired to the electrodes 17a and 17b. The electrically heated catalyst 13 is heated when the voltage of the battery V is applied to the electrically heated catalyst (the energization-exothermic substrate) 13. As a result, the electrically heated catalyst 13 may be swiftly (e.g., within 20 to 30 seconds) heated up to a suitable activating temperature range (preferably equal to or higher than 300° C., e.g., 400 to 500° C.), and this activating temperature range can be maintained.

Figure 2A:
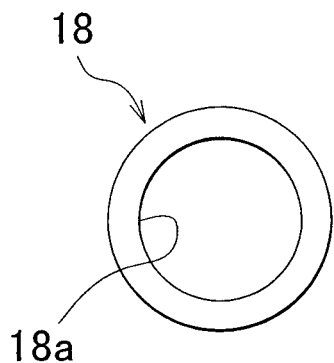
FIGS. 2A and 2B schematically show a heater ring according to the first embodiment of the invention, where
Figure 2B:
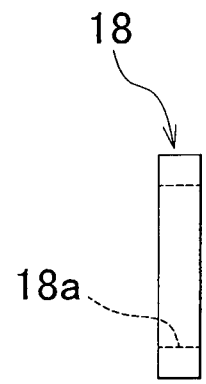

As shown in FIGS. 2A and 2B, the heater ring 18, which is obtained by machining a non-conductive silicon carbide (SiC) material cylindrically, has a uniform thickness (radial width) and a uniform length (axial width). Both end faces of the heater ring 18 in the length direction are planes perpendicular to a ring axis. Thus, a large contact area can be ensured between the electrically heated catalyst (the energization-exothermic substrate) 13 and the upstream catalyst 14. A ring hole 18a penetrating a center of the heater ring 18 serves as an exhaust gas passage. In the outer casing 12, an outer peripheral face of the heater ring 18 contacts the insulating mat 16 with no gap therebetween, and exhaust gas does not flow into the outside of the heater ring 18.

Figure 3A:
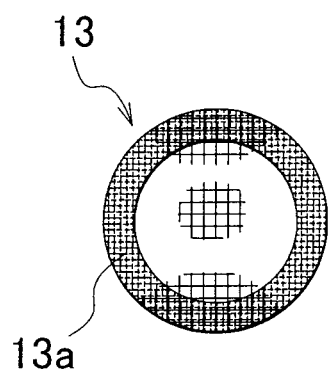
FIGS. 3A and 3B schematically show a honeycombed energization-exothermic substrate of an electrically heated catalyst according to the first embodiment, where
Figure 3B:
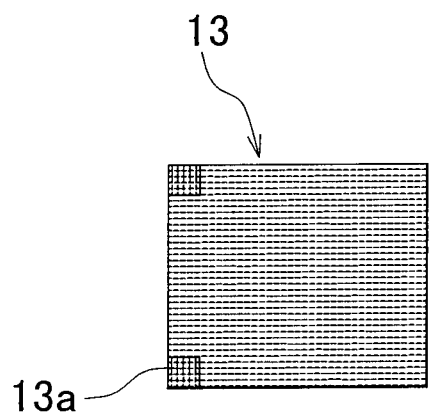

As shown in FIGS. 3A and 3B, a dense portion (a weather strip portion) 13a is formed on an outer peripheral edge portion of an upstream end face of the electrically heated catalyst (the energization-exothermic substrate) 13 along a range adjacent to the heater ring 18. The material (a weather strip material) forming the dense portion 13a may be appropriately selected in consideration of heat resistance and heat conductivity. Silicon carbide (SiC), which is conductive, can be mentioned as a preferred material. A material identical in nature to the energization-exothermic substrate (typically the same material as the energization-exothermic substrate) may be used. It is desirable that to have the range of the upstream end face of the electrically heated catalyst (the energization-exothermic substrate) 13 that forms the dense portion 13a be substantially equal in area where the electrically heated catalyst overlaps with the heater ring 18. By thus setting the range, the exhaust gas passage can be prevented from being stuffed beyond necessity with the energization-exothermic substrate that constitutes the electrically heated catalyst 13, and the performance of purifying exhaust gas can be held good. It should be noted that the dense portion 13a according to this embodiment of the invention is obtained by filling the cells of the electrically heated catalyst (the energization-exothermic substrate) 13 with a conductive material of silicon carbide (SiC) type, and that an end face of the dense portion 13a coincides with the upstream end face of the electrically heated catalyst (the energization-exothermic substrate) 13. Accordingly, the entire dense portion 13a contacts the downstream end face of the heater ring 18 with no gap therebetween.

Figure 4:
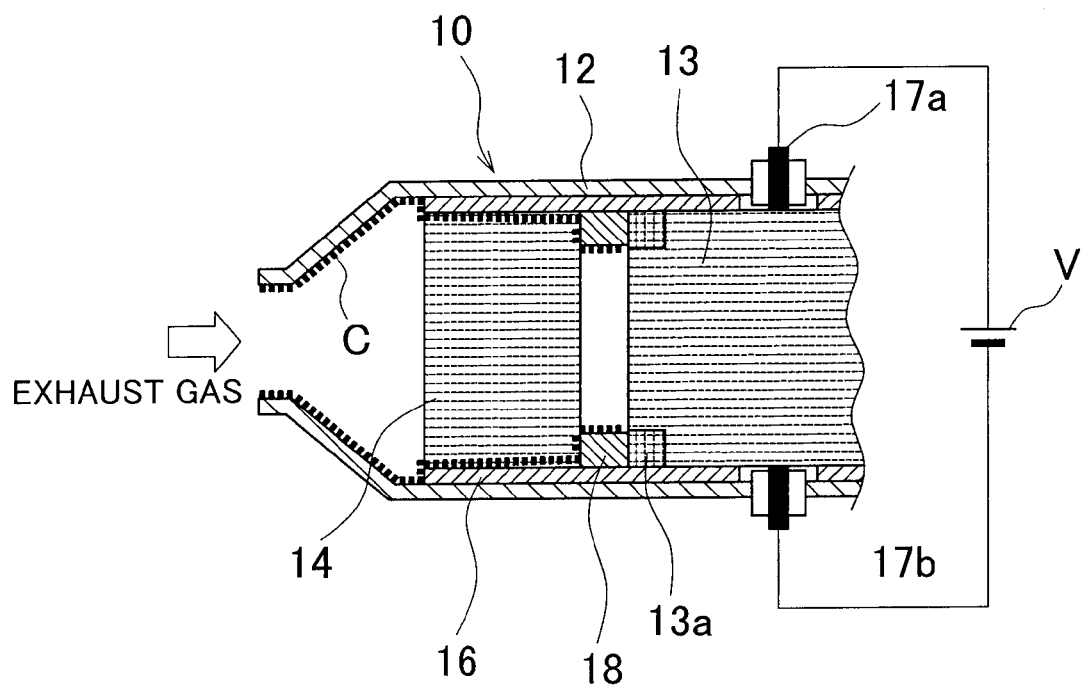
FIG. 4 is a partial cross-sectional view showing the electrically heated catalytic device according to the first embodiment.

If exhaust gas contains soot as a result of the cold start of the engine, the enrichment of an air-fuel ratio during acceleration or the like, the soot may adhere to the inner wall of the outer casing 12. Deposits C (see FIG. 4) of the soot spread from the inner wall of the outer casing 12 to an inner cell wall of the upstream catalyst 14 beyond the insulating mat (the retention mat) 16, and gradually cover the surface of the heater ring 18.

Under such conditions, the electrically heated catalytic device 10 according to this embodiment of the invention heats the electrically heated catalyst 13 through resistive heating when the deposits C of the soot reache the surface of the heater ring 18. The electrically heated catalytic device 10 thereby facilitates the transfer of heat to the adjacent heater ring 18, and removes the deposits C of soot on the surface of the heater ring 18 through combustion. As a result, the deposits C of soot is prevented from reaching the upstream end face of the electrically heated catalyst 13, and thereby prevents the short-circuiting of the inner wall of the outer casing 12 and the electrically heated catalyst 13. Because the electrically heated catalyst (the energization-exothermic substrate) 13 is the only heat source of the heater ring 18, extra electrically heated wirings and the like are not required. Consequently, the device is extremely compact.

Further, in the electrically heated catalytic device 10, heat is efficiently transferred from the dense portion 13a of the electrically heated catalyst (the energization-exothermic substrate) 13 to the heater ring 18. Therefore, as the temperature of the electrically heated catalyst (the energization-exothermic substrate) 13 increases, the heater ring 18 assumes a high-temperature state in a short time. As a result, the soot accumulated on or near the heater ring 18 may be swiftly removed through combustion by the heat from the surface of the heater ring.

Furthermore, in the electrically heated catalytic device 10 according to this embodiment, the upstream catalyst 14 and the downstream catalyst 15 are arranged upstream and downstream of the electrically heated catalyst (the energization-exothermic substrate) 13 via the gaps S1 and S2 respectively. Therefore, the discharge of heat from the electrically heated catalyst 13 and the heater ring 18 is suppressed by these gaps S1 and S2. Thus, the heater ring 18 may be quickly heated due to an improvement in temperature-rising properties when the electrically heated catalyst (the energization-exothermic substrate) 13 is energized. In contrast, the heat retention after energization of the electrically heated catalyst (the energization-exothermic substrate) 13 has ended is improved, and the amount of power consumed by the battery V is minimized, by reducing the frequency at which the electrically heated catalyst (the energization-exothermic substrate) 13 is re-energized.

Although an embodiment of the invention has been described above, various modifications may be made to the embodiment without departing from the scope of the invention. In the above embodiment of the invention, the upstream catalyst 14 and the downstream catalyst 15 are arranged upstream and downstream of the electrically heated catalyst (the energization-exothermic substrate) 13, respectively.

Figure 5:
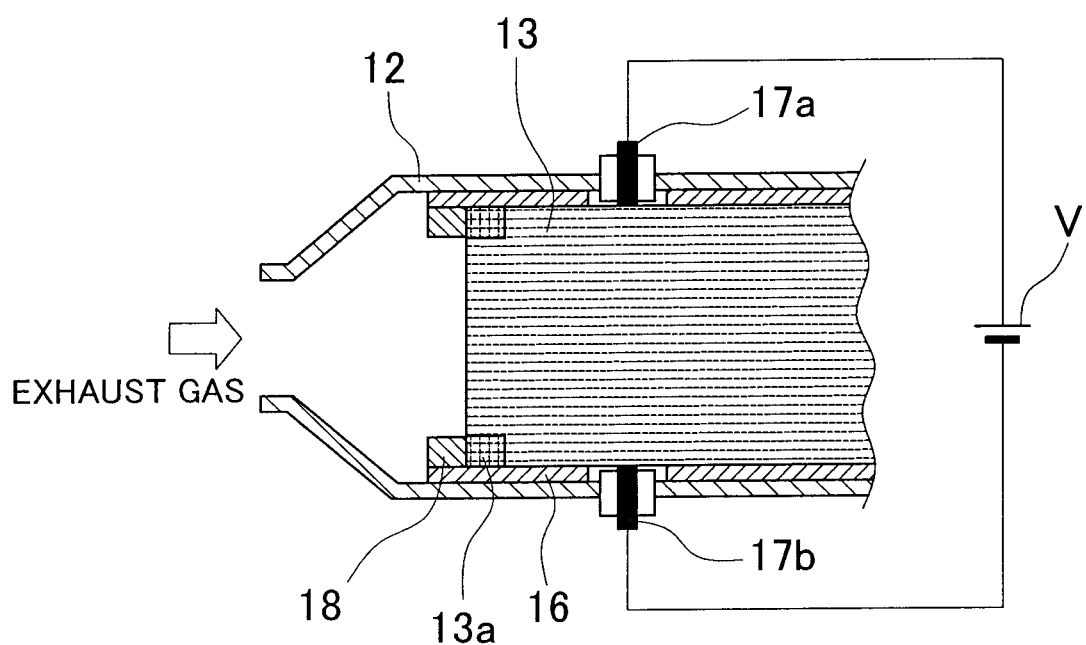
FIG. 5 is a partial cross-sectional view schematically showing an electrically heated catalytic device according to another embodiment of the invention.

However, one or both of the upstream catalyst 14 and the downstream catalyst 15 may be omitted. For example, the alternative embodiment of the invention shown in FIG. 5 is configured so that the single electrically heated catalyst (the energization-exothermic substrate) 13 is provided in the outer casing 12 and the heater ring 18 is located adjacent to the outer peripheral edge portion of the upstream end face of the electrically heated catalyst 13. This configuration facilitates the reduction in size and weight of the device.

Figure 6:
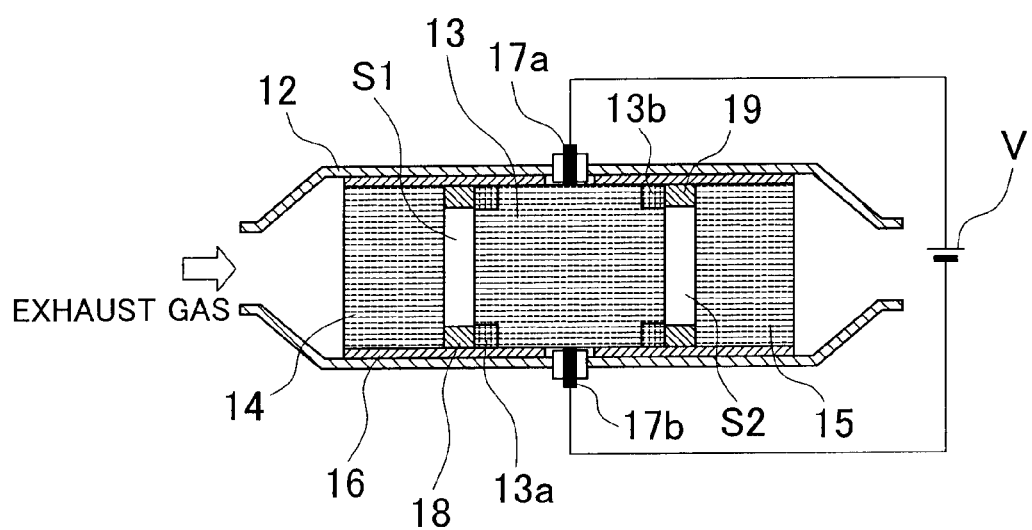
FIG. 6 is a cross-sectional view schematically showing an electrically heated catalytic device according to another embodiment of the invention.

Further, as shown in FIG. 6, a second heater ring 19, identical to the heater ring 18, may be provided downstream of the electrically heated catalyst (the energization-exothermic substrate) 13 in addition to the heater ring 18. In this case, a dense portion 13b identical to the dense portion 13a is provided on an outer peripheral edge portion of the downstream end face of the electrically heated catalyst (the energization-exothermic substrate) 13, and an upstream end face of the heater ring 19 is located adjacent to this dense portion 13b. Thus, even if soot and the like accumulate on the heater ring 19 downstream of the electrically heated catalyst (the energization-exothermic substrate) 13, the accumulated soot and the like may be removed from the surface of the heater ring through combustion. Consequently, the reliability of the catalytic device is enhanced.

While the disclosure has been explained in conjunction with the specific example embodiments thereof, it should be apparent that many alternatives, modifications, and variations will be apparent to those skilled in the art. Accordingly, the example embodiments described are intended to be illustrative, not limiting. Modifications may be made without departing from the scope of the disclosure.

What is claimed is:

1. An electrically heated catalytic device provided in an exhaust pipe, comprising:
    an outer casing;
    an electrically heated catalyst that includes an energization-exothermic substrate that is formed of a material that generates heat through energization, allows exhaust gas to flow therethrough, and is so retained in the outer casing as to allow energization from an outside in a state of being insulated from an inner wall of the outer casing; and a metal catalyst carried on the energization-exothermic substrate; and
    a heater ring that is made of an insulating material, on a surface of which soot that has entered the outer casing together with exhaust gas is deposited so that the heater ring functions as a barrier, wherein the heater ring has a ring hole that penetrates a center of the ring and that serves as an exhaust gas passage, and wherein the heater ring is disposed on an upstream side of the electrically heated catalyst with respect to the exhaust pipe in a state of being in contact with an outer peripheral edge portion of an upstream end face of the substrate;
    wherein the heater ring eliminates soot in exhaust gas, which is deposited on the heater ring, through combustion by heat which is generated in the substrate through energization, and which is transferred to the heater ring.

2. The electrically heated catalytic device according to claim 1, further comprising:
    an insulating mat that is arranged between an inner wall of the outer casing and the electrically heated catalyst,
    wherein the electrically heated catalyst is insulated from the inner wall of the outer casing by the insulating mat.

3. The electrically heated catalytic device according to claim 2, wherein the insulating mat is formed of a ceramic material.

4. The electrically heated catalytic device according to claim 1, further comprising a dense portion that is formed of a material that generates heat through energization, and that is formed at a portion of the outer peripheral edge portion of the upstream end face of the electrically heated catalyst, the dense portion contacting the heater ring.

5. The electrically heated catalytic device according to claim 4, wherein a range of the upstream end face of the electrically heated catalyst, in which the dense portion is formed, is set to be substantially equal to a face adjacent to the heater ring.

6. The electrically heated catalytic device according to claim 1, further comprising an upstream catalyst that is arranged in the outer casing upstream of the electrically heated catalyst, and separated from the electrically heated catalyst by a gap, wherein the heater ring is positioned in the gap between the electrically heated catalyst and the upstream catalyst.

7. The electrically heated catalytic device according to claim 1, further comprising a downstream catalyst that is arranged downstream of the electrically heated catalyst, and separated from the electrically heated catalyst by a gap.

* * * * *